UNITED STATES PATENT OFFICE.

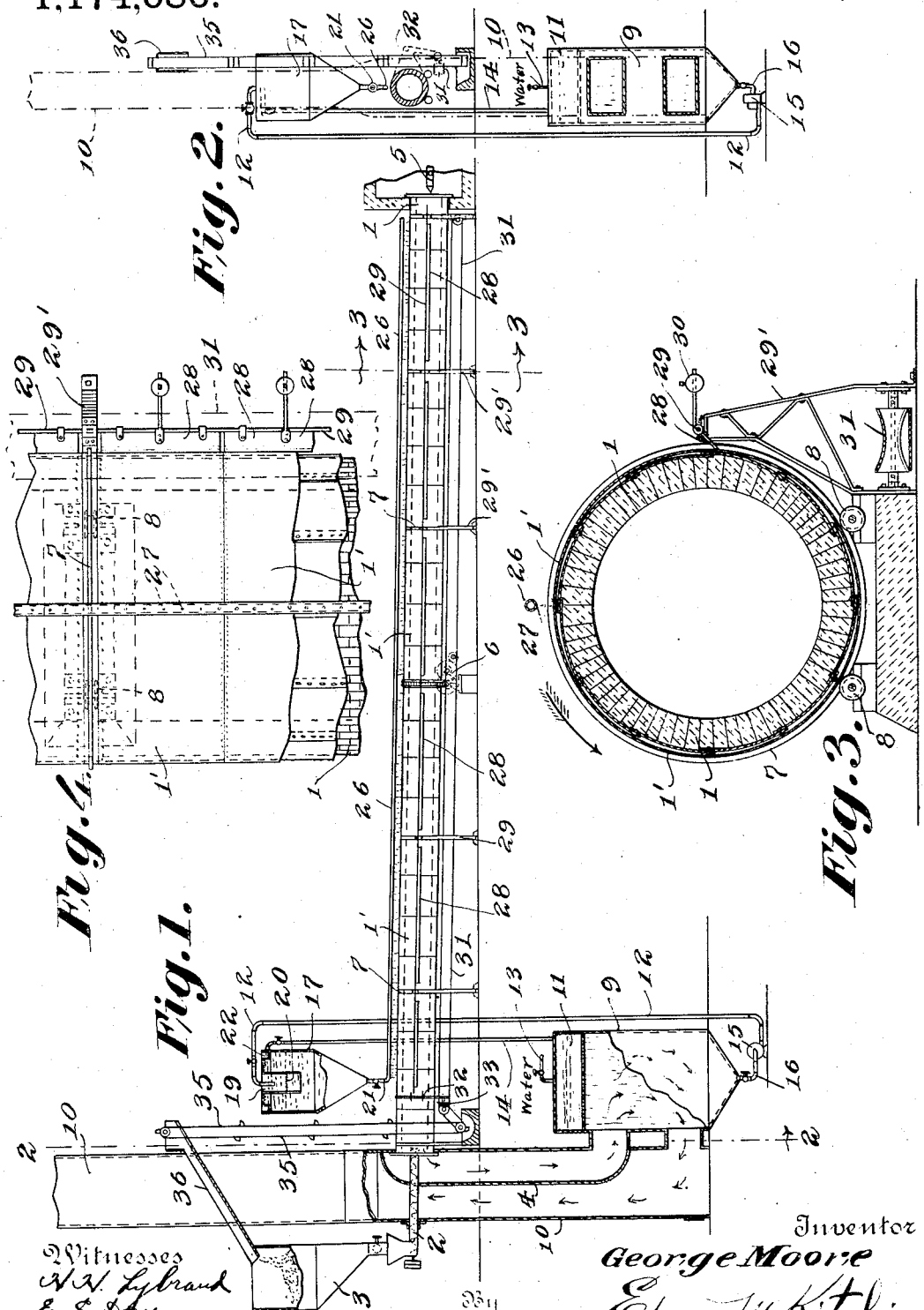
G. MOORE.
CALCINING FURNACE.
APPLICATION FILED MAR. 16, 1914.
1,174,086.
Patented Mar. 7, 1916.
Inventor
George Moore
Edgar W. Kitchin
his Attorney.
Witnesses
N. N. Lybrand
E. E. Day

GEORGE MOORE, OF JOPLIN, MISSOURI.

CALCINING-FURNACE.

1,174,086.  Specification of Letters Patent.  Patented Mar. 7, 1916.

Application filed March 16, 1914. Serial No. 825,022.

*To all whom it may concern:*

Be it known that I, GEORGE MOORE, a citizen of the United States, residing at Joplin, in the county of Jasper and State of Missouri, have invented certain new and useful Improvements in Calcining-Furnaces; and I do hereby declare the following to be a full, clear, and exact description of the invention, such as will enable others skilled in the art to which it appertains to make and use the same.

This invention relates to improvements in calcining furnaces adapted especially for production of Portland cement, and the object in view is the advantageous disposal of light solids discharging from the furnace with the chimney gases.

A further object in view is the disposal of such solids economically and efficiently by returning the same to be retreated, such return being rendered practicable by the utilization of the waste heat of the furnace.

With these and further objects in view, as will in part hereinafter become apparent and in part be stated, the invention comprises certain novel constructions, combinations and arrangements of parts as will be hereinafter specified and claimed.

In the accompanying drawing, Figure 1 is a diagrammatical showing of a structure embodying the features of the present invention, parts being seen in section. Fig. 2 is a transverse, vertical section through the structure taken on the plane indicated by line 2—2 of Fig. 1. Fig. 3 is a section taken on the plane indicated by line 3—3 of Fig. 1. Fig. 4 is a detail fragmentary plan.

Referring to the drawings by numerals, 1 indicates the usual rotary drum of the furnace which, as seen in the drawing, consists of an inner wall or lining of brick or other appropriate refractory material, and an outer metallic casing. Drum 1 is supplied with an outer, smooth metallic casing 1' covering seams, joints, and rivets, so as to present an unbroken surface for reasons herein rendered obvious. The drum inclines from its intake end to its discharge end, the upper or intake end being supplied with material to be calcined through a supply tube 2 having the usual feed screw disposed to receive material from a supply hopper 3, the said intake end of the drum opening into a flue 4 into which the carbonic acid and other gases are discharged. The usual oil or other fuel apparatus 5 discharges into the lower or discharge end of the furnace drum 1, and the drum is revolved by the usual gearing 6 by power supplied from any appropriate source not illustrated, the drum being provided with the usual annular tracks 7 traveling on anti-friction rollers 8.

Flue 4 extends downwardly and discharges into a cleansing chamber 9, which in turn discharges into a stack 10. A sprinkler 11 discharges a constant water shower across the path of the flue products so as to cause the light solids therein to be precipitated, and these collecting at the bottom of chamber 9, drain through valved discharge pipe 16 into pump 15 from which the solids and water are forced up pipe 12 to a settling tank 17. Sprinkler 11 consists of a tank having a perforated bottom.

Pipe 12 directs its discharge into the upper end of a quieting cylinder or tubular baffle 19, preferably provided with a reticulated baffle plate 20 for spreading the discharge and tending to quiet the movement thereof so that the inflowing liquid in passing beneath the lower edge of the drum 19 and entering the main body of water in the settling or thickening tank 17 will not materially interfere with the gravitation of solids to the bottom of the tank. The solids settle by gravity into the bottom of tank 17, which is of the hopper type, and is provided with a discharge pipe 21 at its apex. The pipe 21 is valved for controlling the rate of discharge therethrough, so that the solids may be discharged preferably in a continuous stream, but with a minimum admixture of water. The clear water rises to the upper portion of tank 17 and discharges into a discharge trough 22 arranged about the upper edge of the tank 17. The water discharging into trough 22 is directed back to the sprinkler 11 through a pipe 14. Additional water is also supplied to sprinkler 11 through a pipe 13, from a source not illustrated, to compensate for that lost with the thickened solids.

The solids discharging through pipe 21 are delivered to a distributing pipe 26. Pipe 26 extends along drum 1 just above the same, and is provided with spaced apertures 27 for the discharge of solids down upon the drum 1, for being dried by the waste heat thereof. There are no apertures 27 adjacent those portions of pipe 26 above the tracks 7. The solids in pipe 26 are accompanied by sufficient water to remain fluid until they strike drum 1. The solids rapidly dry after contacting with drum 1, so that before any particular portion of the solids completes a revolution it is dried, but has sufficient adhesion to the metal casing to support its weight during movement of the drum. The incrusted solids are readily scraped off of the drum when brought into engagement with a scraper blade 28, which blade is pivotally supported, as by a rod 29, and sustained by a counter-balance weight 30 in engagement with the surface of the drum. Rod 29 is sustained by spaced frames 29', and scraper 28 is divided into sections terminating short of the tracks 7, and each section has its weight 30. Preferably an outside casing is provided for drum 1 to give a smooth surface for the scrapers to contact with, thus, avoiding the rivets and laps of the usual kiln.

Extending longitudinally throughout the length of the drum 1 and beneath the line of the scraper blade 28 is an endless conveyer belt 31 supported on appropriate rollers and driven by a drum disposed at one terminus of the conveyer, the drum being carried by a drive shaft receiving power through gearing 33 actuated by chain belt 32 extending about the drum 1. At that end of the conveyer 31 nearer the hopper 3, the conveyer discharges into the buckets of an elevator 35 which convey the solids to a end of conveyer 31 nearer the hopper 3. The conveyer 35 is driven by gearing actuated by drum 1, and the several buckets of the conveyer dip successively into a well or pocket 38 into which the conveyer 31 discharges.

The operation will be understood from the foregoing and may be briefly stated as follows: The raw material is continuously supplied through pipe 2, the drum 1 continuously rotated, and the fuel continuously supplied through pipe 5, so that as the materials are sufficiently calcined they fall in the form of powder from the lower end of drum 1 while the gases and certain light solids escape out through flue 4. The shower from sprinkler 11 is maintained continuously. The solids forced up by pump 15 are collected in the bottom of tank 17 and delivered therefrom with as small proportion of water as practicable into pipe 26 from which the wet solids are discharged in a manner for effectively utilizing the waste heat of the drum in drying the solids and thus restoring the same to a condition adapting them to be refed to the furnace.

What I claim is:—

1. In a calcining furnace, the combination with a furnace proper, of means for discharging hydrating waste solids in a sheet against the exterior of the furnace in quantities substantially only sufficient for requiring the waste heat of the furnace for drying.

2. In a calcining furnace, the combination with a furnace proper, of a pipe extending along the furnace above the same, and having discharge apertures opening toward the furnace, and means for delivering hydrated solids to the pipe, the apertures in the pipe being proportioned to permit discharge of such solids on to the furnace in quantities substantially only requiring the waste heat of the furnace for drying.

3. In a calcining furnace, the combination with a furnace proper, of means for directing hydrated waste solids and discharging the same down onto the exterior of the furnace for being dried by the waste heat thereof.

4. In a calcining furnace, the combination with a furnace proper, of a conductor disposed above the furnace and having means of discharge directed toward the furnace and proportioned to deliver hydrated solids in quantities substantially only requiring the waste heat of the furnace for drying, and means for delivering hydrated waste solids to the conductor.

5. In a calcining furnace, the combination of a furnace proper, a pipe extending along and above the furnace and having discharge apertures opening toward the furnace, and means for delivering hydrated solids in a fluid condition to the pipe under pressure sufficient for insuring discharge through the apertures at a rate proportioned to deliver hydrated solids in quantities substantially only requiring the waste heat of the furnace for drying.

6. In a calcining furnace, the combination with a furnace proper, of means for sufficiently hydrating waste solids therefrom for producing a fluid mass, means for separating solids and fluid by gravity, and means for drying the separated solids by the waste heat of the furnace.

7. In a calcining furnace, the combination with a rotary furnace drum, of means for hydrating solids in gases discharged from the drum for removing the solids therefrom, a pipe extending along and above the drum, and having discharge apertures directed toward the drum, and means for supplying the hydrated solids to the pipe, the discharge apertures of the pipe being proportioned to supply hydrated solids in quantities substantially only requiring the waste heat of the drum for drying.

8. In a calcining furnace, the combination with a rotary furnace drum, of means for hydrating solids in gases discharged from the drum for removing such solids from the gases, means for spreading the solids on upper portions of the drum for drying same, and a scraper disposed to engage the drum for removing dried solids incident to the motion of the drum.

9. In a calcining furnace, the combination with a furnace proper, and means for supplying material thereto, of means for hydrating solids in gases discharged from the furnace for removing such solids from the gases, means for spreading the solids on upper portions of the furnace for drying the same, means for removing the dried solids, and conveying means for returning the dried solids to the material supply means for the furnace.

10. In a calcining furnace, the combination with a furnace proper, of means for hydrating waste solids therefrom, of a clarifying tank, means for delivering the hydrated solids to the tank for gravity separation from the moisture, and means for delivering the solids from the tank to be dried by the waste heat of the furnace.

11. In a calcining furnace, the combination with a furnace proper, of means for sufficiently hydrating waste solids from the furnace for producing a fluid mass, means for separating solids and fluid by gravity, means for drying the separated solids by the waste heat of the furnace, and means for conveying the dried solids back to the furnace.

12. In a calcining furnace, the combination with a rotary furnace drum, of means for hydrating solids in gases discharged from the drum for removing the solids from the gases, a pipe extending along and above the drum, and having discharge apertures directed toward the drum, means for separating the hydrated solids from water by gravity, and means for delivering the separated solids to said pipe.

13. In a calcining furnace, for the manufacture of Portland cement, the combination, with a rotary furnace drum, of means for hydrating the waste solids from the drum for recovering such solids, means for applying the hydrated solids in a fluid state on to the drum in quantities sufficient to substantially only require the waste heat of the drum for drying the solids, and means for continuously removing solids dried on the drum for clearing the surfaces of the drum for the reception of a fresh supply of the fluid mass.

14. In a calcining furnace, for the manufacture of Portland cement, the combination, with a rotary furnace drum, of means for hydrating the waste solids from the drum for recovering such solids, means for applying the hydrated solids in a fluid state on to the drum in quantities sufficient to substantially only require the waste heat of the drum for drying the solids, a scraper disposed to engage the drum and continuously remove dried solids therefrom for providing clean surfaces for the reception of a fresh supply of fluid mass, and a conveyer disposed along the drum beneath the line of the scraper for removing dislodged solids.

15. The combination, with a furnace, of means for hydrating waste solids therefrom and recovering the solids in the form of a viscous mass, means disposed entirely exterior of the furnace for discharging the viscous mass down on to the exterior of the furnace in the form of a relatively thin sheet and in quantities sufficient to substantially only require the waste heat of the furnace for drying the solids, and means for removing the solids from the furnace when dried.

In testimony whereof I affix my signature in presence of two witnesses.

GEORGE MOORE.

Witnesses:
N. CURTIS LAMMOND,
E. E. DAY.